United States Patent
Ricke (10) Patent No.: US 12,312,026 B2
(45) Date of Patent: May 27, 2025

(54) METHOD FOR MONITORING A COUPLING CONNECTION BETWEEN VEHICLE PARTS OF A VEHICLE COMBINATION, AND VEHICLE COMBINATION

(71) Applicant: ZF CV Systems Global GmbH, Bern (CH)

(72) Inventor: Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 641 days.

(21) Appl. No.: 17/732,163

(22) Filed: Apr. 28, 2022

(65) Prior Publication Data

US 2022/0355873 A1    Nov. 10, 2022

(30) Foreign Application Priority Data

May 10, 2021   (DE) ...................... 10 2021 112 071.3

(51) Int. Cl.
*B62D 53/08* (2006.01)
*G01P 15/08* (2006.01)

(52) U.S. Cl.
CPC ..... *B62D 53/0885* (2013.01); *B62D 53/0878* (2013.01); *G01P 15/0802* (2013.01)

(58) Field of Classification Search
CPC ............ B62D 53/0885; B62D 53/0878; G01P 15/0802; G01P 2015/0848
See application file for complete search history.

(56) References Cited

U.S. PATENT DOCUMENTS

| | | | |
|---|---|---|---|
| 5,438,881 A | 8/1995 | Schedrat et al. | |
| 6,302,424 B1 * | 10/2001 | Gisinger | B62D 53/08 280/433 |
| 8,827,040 B2 * | 9/2014 | Schmidt | B62D 53/0885 184/5 |
| 11,428,589 B2 * | 8/2022 | Schutt | G01G 21/23 |
| 2019/0118876 A1 * | 4/2019 | Schutt | B62D 53/10 |
| 2019/0225286 A1 * | 7/2019 | Schutt | G01L 1/2218 |
| 2020/0158040 A1 | 5/2020 | Megner et al. | |

(Continued)

FOREIGN PATENT DOCUMENTS

| | | |
|---|---|---|
| DE | 44 02 528 A1 | 8/1994 |
| DE | 10 2016 207 985 A1 | 11/2017 |

(Continued)

*Primary Examiner* — Kevin Hurley
*Assistant Examiner* — Marlon A Arce
(74) *Attorney, Agent, or Firm* — Walter Ottesen, P.A.

(57) ABSTRACT

A method for monitoring a coupling connection between vehicle parts of a vehicle combination including the steps: reading of a load change time at which a load change is initiated and/or takes place at a tractor vehicle, a tractor vehicle acceleration changing as a result of the load change; monitoring of a jerk value after the load change time, the jerk value characterizing a tractor vehicle jerk of the tractor vehicle and/or a trailer jerk of a trailer; determining whether, on account of a preceding load change at a jerk time, a tractor vehicle jerk occurs at the tractor vehicle and/or a trailer jerk occurs at the trailer; and, identifying a degree of wear of the coupling connection in dependence upon the jerk time and/or a time delay between the load change time and the jerk time and/or of the jerk value at the jerk time.

20 Claims, 2 Drawing Sheets

(56) References Cited

U.S. PATENT DOCUMENTS

| | | |
|---|---|---|
| 2021/0316799 A1 | 10/2021 | Koester |
| 2022/0205829 A1* | 6/2022 | Kiyokawa ............ G01P 15/0802 |
| 2022/0289317 A1* | 9/2022 | Dieter ................ B62D 53/0807 |
| 2022/0410988 A1* | 12/2022 | Prem ................. B62D 53/0885 |

FOREIGN PATENT DOCUMENTS

| | | |
|---|---|---|
| DE | 20 2019 103 438 U1 | 2/2020 |
| DE | 10 2018 129 259 A1 | 5/2020 |
| DE | 10 2019 108 954 A1 | 10/2020 |

\* cited by examiner

METHOD FOR MONITORING A COUPLING CONNECTION BETWEEN VEHICLE PARTS OF A VEHICLE COMBINATION, AND VEHICLE COMBINATION

CROSS REFERENCE TO RELATED APPLICATION

This application claims priority of German patent application no. 10 2021 112 071.3, filed May 10, 2021, the entire content of which is incorporated herein by reference.

TECHNICAL FIELD

The present disclosure relates to a method for monitoring a coupling connection between vehicle parts of a vehicle combination, and to a vehicle combination.

BACKGROUND

A coupling connection is normally provided for the pivotable connection of vehicle parts of a vehicle combination, for example between a tractor vehicle and a trailer, which coupling connection has a first coupling part, for example a drawbar coupling, on the tractor vehicle and a second coupling part, for example a drawbar with an eye, on the trailer, which coupling parts are connected to one another via a connecting element, for example a bolt. Furthermore, a fifth wheel plate with a kingpin received pivotably therein can also be provided in a semitrailer. Pivotable connections of this type are subject to wear on account of the sustained loading over time and wear out as a result.

Experienced drivers recognize on the basis of the driving behavior of the vehicle combination whether the coupling connection between the vehicle parts is worn out, and check the coupling connection independently, possibly via a caliper. The greater the wear on the drawbar coupling and drawbar eye and/or the respective coupling parts, the more the respective trailer pushes onto the preceding vehicle part in the case of a brake operation or the respective trailer pulls on the respective preceding vehicle part in the case of an acceleration. This is perceived by the manual driver as unpleasant "jerking". The virtual driver or inexperienced human drivers cannot categorize this jerking, however, and perceive it as normal.

This can become dangerous, above all, when the problem is ignored for a long time. On account of the sustained loading, the drawbar coupling can snap from a crossmember on the tractor vehicle as a result of material fatigue, and the tractor vehicle loses the trailer. The wear of the vehicle body is therefore increased. Furthermore, the driving stability is influenced by the jerking.

SUMMARY

It is an object of the disclosure to provide a method, by way of which, even in vehicle combinations which are operated by inexperienced drivers or which are operated in an automated manner, a degree of wear of a coupling connection can be monitored simply and reliably even while driving. Furthermore, it is a further object of the disclosure to provide a vehicle combination.

Accordingly, according to an embodiment of the disclosure, at least the following steps are provided in a method for monitoring a coupling connection between vehicle parts of a vehicle combination, the vehicle combination having, as vehicle parts, at least one tractor vehicle and at least one trailer:

reading of a load change time, at which a load change is initiated and/or takes place at the tractor vehicle, a tractor vehicle acceleration changing as a result of the load change
from a positive acceleration value to a negative acceleration value or vice versa, or
from an acceleration value of zero to a negative acceleration value or a positive acceleration value, or
from a negative acceleration value or a positive acceleration value to zero;
monitoring of a jerk value after the load change time, the jerk value characterizing a tractor vehicle jerk of the tractor vehicle and/or a trailer jerk of the trailer;
determining whether, on account of a preceding load change at a jerk time, a tractor vehicle jerk occurs at the tractor vehicle and/or a trailer jerk occurs at the trailer, identifying of a degree of wear of the coupling connection between the vehicle parts in a manner which is dependent on the jerk time and/or a time delay between the load change time and the jerk time and/or of the jerk value at the jerk time.

The circumstance can therefore preferably be utilized that, in the case of load changes at a load change time, a worn-out or worn coupling connection leads to the trailer following the tractor vehicle in a delayed manner, to be precise only when a wear-induced play in the coupling connection has been overcome in the case of the load change. This makes itself noticeable at the tractor vehicle by virtue of the fact that a tractor vehicle jerk occurs at the tractor vehicle at a time delay from the load change time. At the same time, this jerk is also transmitted to the trailer, with the result that a trailer jerk can also be perceived there. This time delay can be measured accordingly, and a degree of wear can be estimated in a simple way from it.

In addition, a quantitative statement about the degree of wear can also be made in a manner which is dependent on the length of the time delay and/or the magnitude of the jerk at the tractor vehicle and/or at the trailer, by, for example, an assignment to a corresponding value for the degree of wear taking place via a characteristic curve or a look-up table. In order to make a reliable statement about the degree of wear, it can preferably be provided that the monitoring of the coupling connection between the vehicle parts of the vehicle combination takes place over an observation time period, the observation time period being selected in such a way that, in the observation time period, more than one load change takes place and a dedicated degree of wear is identified for each load change in the above-described way. As a result, it can be prevented that driving situations, in which a load change does not necessarily lead to a jerk at the tractor vehicle and/or at the trailer despite a worn-out coupling connection, lead to a distorted monitoring result or to the determination of a distorted degree of wear.

Furthermore, it can preferably be provided that, in order to determine whether a load change is initiated and/or takes place, it is identified, from a drive signal of an electronic drive system of the tractor vehicle and/or a clutch signal of an electronic clutch system of the tractor vehicle and/or a brake signal of an electronic brake system of the tractor vehicle, whether a drive request and/or brake request and/or a clutch request (for example as a result of a gear change request) is present or has ceased. In this way, the load change time can be identified in a simple way from a retardation time (start of a retardation/brake operation) which follows from the brake signal, an acceleration time (start of an acceleration) which follows from the drive signal, or a rolling time (neither acceleration or retardation) which follows from the clutch signal in the case of opening of the clutch and is present, for example, in the case of the initiation of a gear change request. Depending on whether there is a drive request, the acceleration time can also additionally be identified after a gear change on the basis of the clutch signal when the clutch is closed again, at which acceleration time the tractor vehicle again gains momentum. It follows here from the respective signals at the respective times whether the acceleration value of the tractor vehicle changes between zero and a positive value or a negative value (or vice versa) or changes between a positive and a negative value (or vice versa).

Furthermore, it can preferably be provided that, in order to monitor the jerk value, after the load change time, the tractor vehicle acceleration over a time and/or the trailer acceleration over a time are/is identified, and a jerk value for the tractor vehicle jerk and/or a jerk value for the trailer jerk are/is identified continuously by way of temporal deriving of the acceleration values which are identified as a result. As a result, simple identifying of the jerk is made possible from variables which can be measured and are present at any case in the tractor vehicle and in the trailer, for example the tractor vehicle acceleration which is identified from the wheel rotational speeds and/or the trailer acceleration which is identified via an acceleration sensor.

In order, here, to take into consideration simultaneous braking of the trailer with the tractor vehicle, for example within the context of an anti-jackknifing brake operation, it can be provided, furthermore, that the degree of wear follows from the time delay and/or from the jerk value with consideration of a difference between the trailer acceleration and the tractor vehicle acceleration acting (positive to zero or positive to negative) after the load change. As a result, the relative movement between the two vehicle parts can be taken into consideration if the tractor vehicle together with the trailer is braked actively and the time delay is therefore not brought about only by way of the play.

It can preferably be provided, furthermore, that, in order to determine whether, on account of a preceding load change at a jerk time, a tractor vehicle jerk at the tractor vehicle and/or a trailer jerk at the trailer occur/occurs, a check is made as to whether the magnitude (that is, the value in terms of magnitude) of the jerk value which characterizes the respective jerk exceeds a fixed jerk limit value. As a result, reference can be made to previously verified jerk values which occur in the case of a load change and a worn coupling connection, in order not to take into consideration jerk results which occur during normal driving operation at the tractor vehicle and/or at the trailer in the wear estimation.

It can preferably be provided here that the jerk limit value is fixed in a manner which is dependent on a trailer mass of the respective coupled trailer and/or a tractor vehicle mass of the tractor vehicle. As a result, it is taken into consideration that a tractor vehicle jerk at the tractor vehicle which occurs on account of the delayed tracking of the trailer turns out to be more pronounced, the greater the trailer mass is in comparison with the tractor vehicle mass. By way of corresponding fixing of the jerk limit value in a manner which is dependent on these masses, the respective situation can be reflected exactly and, as a result, a loading state can also be taken into consideration, for example. Here, the trailer mass and tractor vehicle mass can be read at the time correspondingly and, as a result, can be taken into consideration immediately in the monitoring by way of a changing jerk limit value. In addition, it can also be provided here that different jerk limit values are fixed for the trailer and the tractor vehicle.

Furthermore, it can preferably be provided, that a notification signal is output, for example to the driver or the fleet operator, in a manner which is dependent on the identified degree of wear, in particular when the degree of wear exceeds a wear limit. As a result, this can be reacted to correspondingly by way of a check of the coupling connection and possibly by way of a replacement.

It can preferably be provided, furthermore, that an automated actuation of an electronic drive system of the tractor vehicle and/or of an electronic brake system of the tractor vehicle takes place in a manner which is dependent on the identified degree of wear, in particular when the degree of wear exceeds a wear limit, in order to stop the vehicle combination in an automated manner at a corresponding position. As a result, a worn or worn-out coupling connection can be reacted to in a corresponding minimum risk maneuver if no replacement has taken place and/or a critical wear limit has currently been reached.

Furthermore, it can preferably be provided that the coupling connection is configured by way of a first coupling part on a vehicle part of the vehicle combination, for example a drawbar coupling on a crossmember of the tractor vehicle or a fifth wheel plate with an attachment bracket and a locking mechanism, and a second coupling part on a further vehicle part of the vehicle combination, for example an eye on a drawbar of a trailer following the tractor vehicle or a kingpin, the coupling parts being connected to one another pivotably. Here, the degree of wear is preferably defined by a wear-induced play between the coupling parts. In the case of a coupling connection of this type, in particular, but also in the case of comparable coupling connections, a play can occur which can be determined in a simple way by way of the described method and on the basis of which a degree of wear can be identified.

Furthermore, it can preferably be provided that, before the reading of the load change time, it is first of all determined whether there is a trailer connection between the vehicle parts of the vehicle combination, that is, between the tractor vehicle and a trailer or between trailers of the vehicle combination. As a result, the processing complexity can be minimized since the method is carried out merely in the case of a coupled trailer.

According to an aspect of the disclosure, a vehicle combination having a plurality of vehicle parts is provided, the vehicle combination having, as vehicle parts, at least one tractor vehicle and at least one trailer, a coupling connection being configured between the vehicle parts of the vehicle combination, by way of which coupling connection the vehicle parts are connected to one another pivotably, the coupling connection being configured by way of a first coupling part on one vehicle part of the vehicle combination and a second coupling part on a further vehicle part of the vehicle combination, the coupling parts being connected to one another pivotably, a monitoring unit being arranged in the tractor vehicle, which monitoring unit is configured to carry out a method according to the disclosure, in order to identify a degree of wear of the coupling connection in a manner which is dependent on a wear-induced play between the coupling parts.

BRIEF DESCRIPTION OF THE DRAWINGS

The invention will now be described with reference to the drawings wherein.

DESCRIPTION OF THE PREFERRED EMBODIMENTS

Figure 1A:
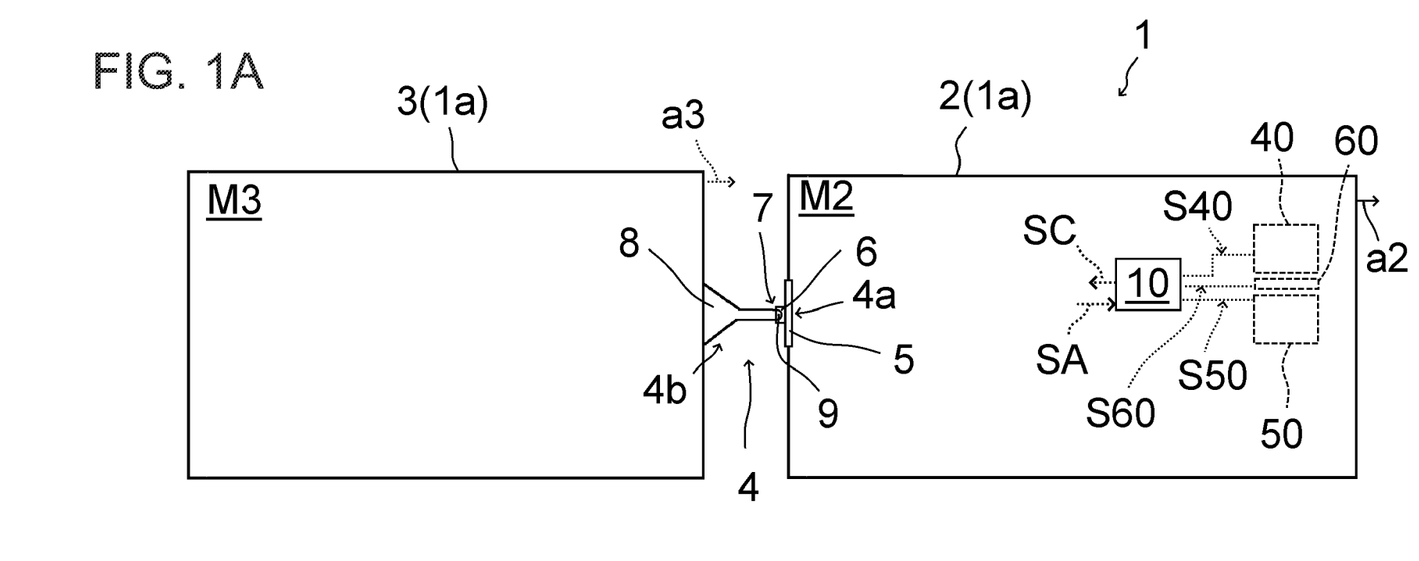
FIG. 1A shows a diagrammatic view of a vehicle combination.

FIG. 1A shows a diagrammatic view of a vehicle combination 1 which has a plurality of vehicle parts 1a, here a tractor vehicle 2 and a trailer 3, it also being possible for further trailers 3 to be provided. Coupling connections 4 are configured in each case between the tractor vehicle 2 and the trailer 3 or between the individual vehicle parts 1a, which coupling connections have in each case a first coupling part 4a on one of the vehicle parts 1a and a second coupling part 4b on the respective adjacent vehicle part 1a. The two coupling parts 4a, 4b are connected to one another in any desired way such that the vehicle parts 1a can pivot with respect to one another.

Figure 1B:
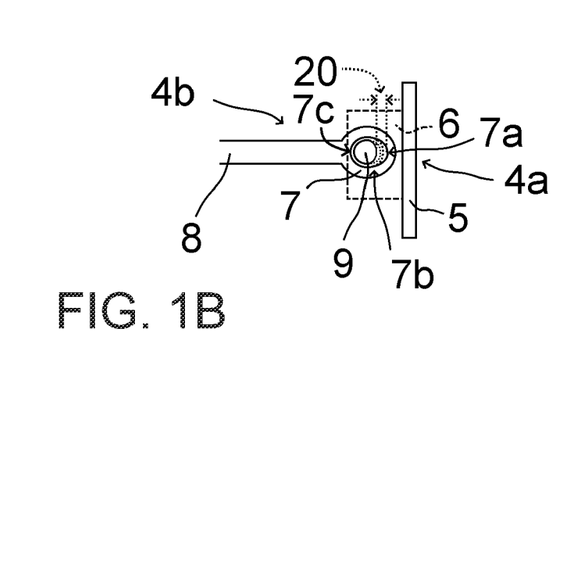
FIG. 1B shows a detailed view of a coupling connection of the vehicle combination according to FIG. 1A.
Figure 1C:
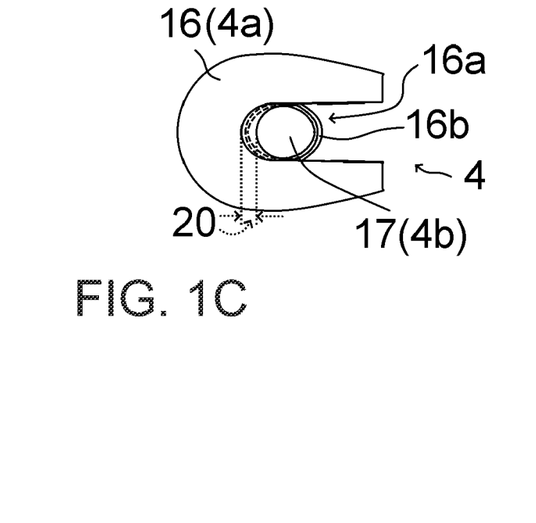
FIG. 1C shows a detailed view of an alternative coupling connection.

The first coupling part 4a can have, for example, a drawbar coupling 6 which is arranged on a crossmember 5 of the tractor vehicle 2, and the second coupling part 4b can have an eye 7 which is arranged on a drawbar 8 on the respective trailer 3. Here, the eye 7 is received pivotably in the drawbar coupling 6 via a releasable bolt 9, with the result that the trailer 3 can pivot with respect to the tractor vehicle 2. Coupling connections 4 of this type can likewise be provided between two trailers 3 as vehicle parts 1a. Other identically acting coupling connections 4 with two coupling parts 4a, 4b which can be pivoted with respect to one another and wear down are fundamentally also possible. Thus, for example, the coupling connection 4 which is present in the case of a semitrailer (see FIG. 1C), has a fifth wheel plate 16 (first coupling part 4a) which is arranged on the tractor vehicle 2 (semitrailer tractor) with an attachment bracket 16a and with a locking device 16b, and a kingpin 17 (second coupling part 4b) which is arranged on the trailer 3 (semitrailer), can also be provided, in order to connect the two vehicle parts 1a to one another pivotably.

During the course of the service life of coupling connections 4 of this type, the bolts 9 of the drawbar coupling 6 and the eyes 7 of the drawbars 8 or the kingpin 17 and the fifth wheel plate 16 and/or its attachment bracket 16a are subject to wear. This leads to a play 20 in the connection between the two respective vehicle parts 1a, as illustrated in the detailed view in FIG. 1B and FIG. 1C, the dashed lines corresponding to the ideal contours of the respective component 7, 9; 16, 17 in the new state. This play 20 can normally be perceived by way of "jerking" in such a way that, in the case of an acceleration of the tractor vehicle 2 at an acceleration time tB, the trailer 3 does not immediately follow, but rather only after a time delay dt, as shown in FIG. 2, the time delay dt being dependent on the play 20 in the coupling connection 4.

If the tractor vehicle 2 therefore accelerates, from the acceleration time tB, constantly with an acceleration value aW for the tractor vehicle acceleration a2 of, for example, 1 m/s², the bolt 9 has been displaced after a corresponding time delay dt within the eye 7 from a front longitudinal side 7a of the eye or the center 7b of the eye to the rear longitudinal side 7c on account of the play 20, with the result that, after this time delay dt, the tractor vehicle 2 begins to pull the trailer 3. This applies comparatively to the kingpin 17 which is received in the attachment bracket 16a of the fifth wheel plate 16 and is displaced longitudinally therein within the time delay dt on account of the play 20.

As a result, a tractor vehicle jerk j2 is produced at the tractor vehicle 2 after this time delay dt at a jerk time tj since the tractor vehicle acceleration a2 decreases abruptly as a result of the sudden pronounced positive acceleration of the trailer 3. As a result of the connection to the trailer 3, a trailer jerk j3 can also be sensed at this trailer at the jerk time tj.

Figure 2:
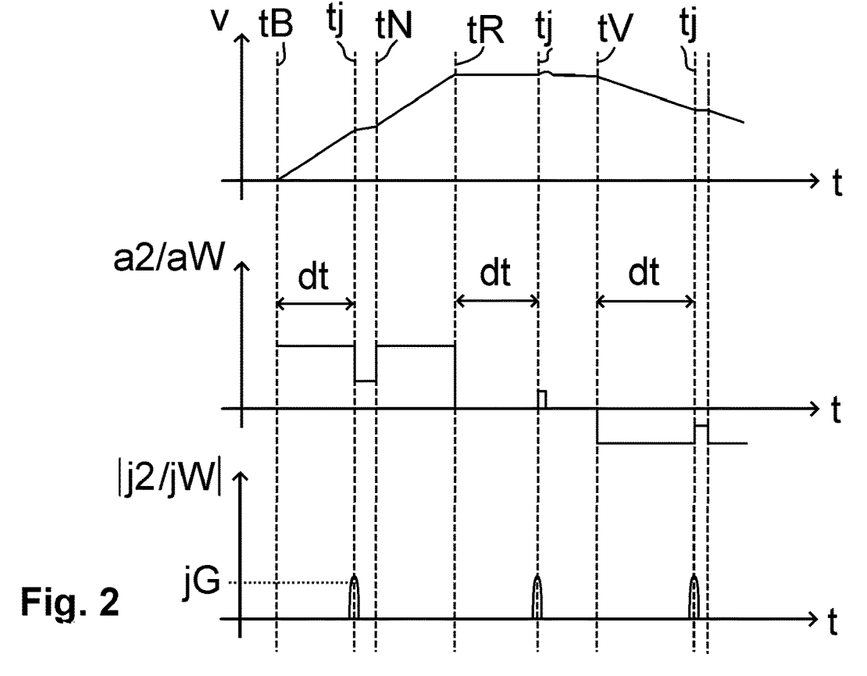
FIG. 2 shows chronological sequences during a load change.

According to the example in FIG. 2, the acceleration value aW for the tractor vehicle acceleration a2 decreases from the initial 1 m/s² to 0.5 m/s², to which end it is assumed, for example, that a force of 5 kN is applied to a tractor vehicle 2 with a tractor vehicle mass M2 of 5 tonnes, in order to achieve an acceleration value aW of 1 m/s² at the tractor vehicle 2. When, after the time delay dt, the trailer 2 (for example, with a trailer mass M3 of likewise 5 tonnes) is then also pulled, a force of 5 kN pulls an overall mass of 10 tonnes, as a result of which, according to Newton's second law (F=M*aW), an acceleration value aW of only 0.5 m/s² acts both on the tractor vehicle 2 and on the trailer 3. In accordance with the chronological sequence of this acceleration change from 1 m/s² to 0.5 m/s², a defined tractor vehicle jerk j2 (derivation of the tractor vehicle acceleration a2 after the time t) results and, by way of reaction on the trailer 3, a measurable trailer jerk j3 (derivation of a trailer acceleration a3 after the time t) also results. The heavier the trailer 3 is here, the greater the negative acceleration on the tractor vehicle 2, that is, the tractor vehicle jerk j2 (m/s³) is correspondingly also greater and can correspondingly be perceived more readily.

In the case of the presence of this play-caused tractor vehicle jerk j2 or shortly after perceiving it, the manual or virtual driver of the tractor vehicle 2 readjusts correspondingly, in order to arrive again at the preceding acceleration value aW for the tractor vehicle acceleration a2 and then also for the trailer acceleration a3 of 1 m/s², as shown in FIG. 2 from the readjustment time tN.

In order to determine the play 20 in the coupling connection 4 in a manner which proceeds from this, the time t between the acceleration time tB and the jerk time tj, that is, the time delay dt, is essentially to be evaluated. If there is no play 20 in the drawbar coupling 6 and on the bolt 9 or in the eye 7 and on the kingpin 17 or on the fifth wheel plate 16, the tractor vehicle jerk j2 or the trailer jerk j3 is not perceivable or is zero because the tractor vehicle 2 pulls equally on the two vehicle parts 1a from the beginning or accelerates. If the coupling connection 4 is worn out or worn, however, a tractor vehicle jerk j2 and, as a consequence, also a trailer jerk j3 can be perceived after a certain time delay dt.

One exception exists here if the vehicle combination 1 is parked in a stretched manner on a slope and moves off uphill from a standstill, since, in this case, the bolt 9 already bears against the rear longitudinal side 7c of the eye 7, and the kingpin 17 is also therefore no longer displaced in the attachment bracket 16a of the fifth wheel plate 16 and the trailer 3 is thus pulled along immediately. Correspondingly, no tractor vehicle jerk j2 or trailer jerk j3 which follows from a play 20 can be sensed and, accordingly, no time delay dt can be identified. Accordingly, a different driving situation is to be selected, in which the play 20 again takes effect.

For example, a tractor vehicle jerk j2 and a trailer jerk j3 can then also be sensed, and therefore a time delay dt can be identified in the case of a worn coupling connection 4, when the tractor vehicle 2 stops accelerating and continues to move at a constant tractor vehicle speed v, that is, the tractor vehicle acceleration a2 or the acceleration value aW for the tractor vehicle acceleration a2 is reduced to zero and the tractor vehicle 2 continues to roll without acceleration, as is the case in FIG. 2 from a rolling time tR. From this rolling time tR, the trailer 3 initially runs onto the tractor vehicle 2, and the bolt 9 is displaced in the eye 7 from the rear longitudinal side 7c through the center 7b to the front longitudinal side 7a of the eye 7 which it makes contact with after a play-dependent time delay dt or at a jerk time tj. When it makes contact with the front longitudinal side 7a, the trailer 3 accelerates the tractor vehicle 2 for a brief moment and is subsequently pulled again by the tractor vehicle 2 after a brief brake operation. This applies correspondingly to the kingpin 17 which is received in the fifth wheel plate 16. As shown in FIG. 2, a tractor vehicle jerk j2 can be determined on the tractor vehicle 2 and, as a consequence, a trailer jerk j3 can also be determined on the trailer 3 in this situation after the rolling time tR at the jerk time tj or after the time delay dt, which trailer jerk j3 is brought about by way of the play 20 in the coupling connection 4.

A further driving situation, in which the play 20 again takes effect, is present in the case of a change to a negative tractor vehicle acceleration a2 or to a negative acceleration value aW for the tractor vehicle acceleration a2, that is, when the vehicle combination 1 is to be retarded via the tractor vehicle 2. As shown likewise in FIG. 2, a retardation of the vehicle combination 1 is initiated at a retardation time tV, as a result of which the tractor vehicle speed v is reduced. When the tractor vehicle 2 then retards, the trailer 3 which is still unbraked initially runs onto the tractor vehicle 2 and acts counter to the negative tractor vehicle acceleration a2 after a time delay dt. Here too, a reaction in the form of a tractor vehicle jerk j2 can be determined at the tractor vehicle 3 at a jerk time tj or after the time delay dt and, as a consequence, also a trailer jerk j3 at the trailer 3.

In a brake situation of this type, it is to be taken into consideration that, in some electronic brake systems 40, both the tractor vehicle 2 and the trailer 3 are braked equally in the case of the presence of a brake request BA, in order to keep the vehicle combination 1 stretched. Accordingly, in the case of an ideal coordination of the brake effects between the tractor vehicle 2 and the trailer 3, neither a tractor vehicle jerk j2 nor a trailer jerk j3 can be sensed since the tractor vehicle retardation a2 corresponds to the trailer retardation a3 and therefore a difference D between the two is zero.

It is difficult as a rule, however, to coordinate the brake effects of the tractor vehicle 2 and the trailer 3 to one another exactly in such a way that the tractor vehicle retardation a2 corresponds to the trailer retardation a3. Therefore, in the case of the implementation of a defined brake request BA, the trailer 3 will certainly push onto the tractor vehicle 2 (|a2|>|a3|) or the trailer 3 will pull the tractor vehicle 2 (|a2|<|a3|). There is correspondingly a defined difference D between the two (a2, a3). In both cases, both a tractor vehicle jerk j2 and a trailer jerk j3 can be sensed or identified, which jerk can be traced back to a play 20 in the coupling connection 4. In the case of the identifying of the degree of wear VG, this difference D can be taken into consideration correspondingly if there is a brake operation of this type.

In order to identify a play 20 in the coupling connection 4, it is therefore appropriate for the jerk behavior of the tractor vehicle 2 to be observed over a certain observation time period 30 in different driving situations; a series of load changes LW should advantageously be present in the observation time period 30. As described, load changes LW of this type arise in the case of a change of the tractor vehicle acceleration a2 from a positive acceleration value aW or a negative acceleration value aW to zero, from zero to a positive or negative acceleration value aW, or from a negative acceleration value aW to a positive acceleration value aW (or vice versa). An observation time period 30 is ideal, for example, in which the vehicle combination 1 is situated in "stop and go" traffic with a series of load changes LW. A worn-out or worn coupling connection 4 can then be determined very reliably in accordance with the abovementioned principles.

Figure 3:
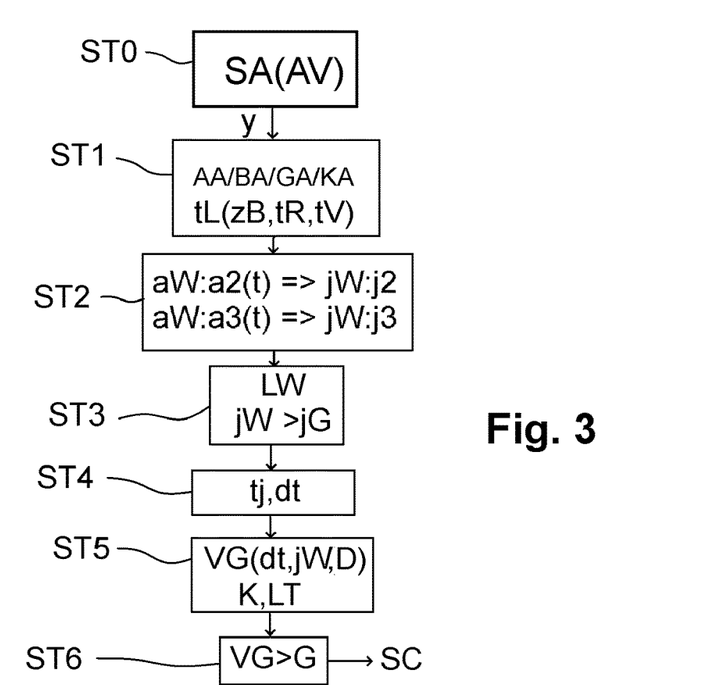
FIG. 3 shows a flow chart of a method according to the disclosure.

In a method according to the disclosure for monitoring a degree of wear VG of a coupling connection 4 by way of a monitoring unit 10 in the tractor vehicle 2, it can be provided according to FIG. 3, for example, for the presence of a trailer connection AV to at least one trailer 3 to be determined first of all in an initial initialization step ST0. This can take place, for example, on the basis of a trailer status signal SA which, in the case of the presence of a trailer connection AV, is transmitted via the CAN interface between the tractor vehicle 2 and the trailer 3 or between a plurality of trailers 3, and which can be read by the monitoring unit 10.

Subsequently, after determining of a present trailer connection AV, it is provided in a first step ST1 for a load change time tL (cf., in FIG. 2, the acceleration time tB, the rolling time tR or the retardation time tV) to be read, at which a load change LW is initiated or is currently actually present at the tractor vehicle 2. This can take place, for example, by virtue of the fact that the presence or the ceasing of a brake request BA is determined by the monitoring unit 10 in a manner which is dependent on a brake signal S40 of an electronic brake system 40 of the tractor vehicle 2. Furthermore, the presence or the ceasing of a drive request AA can be determined by the monitoring unit 10 in a manner which is dependent on a drive signal S50 of an electronic drive system 50 of the tractor vehicle 2. Furthermore, it can also be determined by the monitoring unit 10 on the basis of the drive signal S50 and/or a clutch signal S60 of an electronic clutch system 60 whether a clutch request KA and/or a gear change request GA are/is present, a load being removed from the drive train by way of a requested opening of the clutch, for example during a requested gear change, with the result that the tractor vehicle 2 is no longer accelerated and the trailer 3 runs onto it. Conversely, in the case of a requested closing of the clutch, for example after a requested gear change, it is to be expected that the tractor vehicle 2 is driven again and the trailer 3 is pulled again after a time delay dt in a compatible manner with respect to the abovementioned acceleration time tB. In the case of ceasing of the drive request AA (drive signal S50), for example by way of releasing of the accelerator pedal, and in the case of an absence of a clutch request KA or in the case of a closed clutch (clutch signal S60), it can be determined by the monitoring unit 10, furthermore, whether an engine drag torque is acting on the tractor vehicle 2, that is, a retardation of the tractor vehicle 2 is occurring. The time of the respective determination, which all indicate a load change LW, is then read or stored by the monitoring unit 10 as load change time tL.

In a second step ST2, the tractor vehicle acceleration a2 and/or the trailer acceleration a3 which can be measured in the trailer 3 and can be transmitted to the monitoring unit 10 are/is determined or observed over the time t after the respective load change time tL, and the tractor vehicle jerk j2 of the tractor vehicle 2 and/or the trailer jerk j3 of the trailer 3 and/or a jerk value jW which characterizes the respective jerk j2, j3 can be determined by way of temporal derivation of the respective identified acceleration values aW for the tractor vehicle acceleration a2 and/or the trailer acceleration a3. In a third step ST3, it is first of all determined by the monitoring unit 10 whether a jerk value jW or a jerk j2, j3 identified in the second step ST2 is to be traced back to a load change LW. This can take place, for example, by way of a check as to whether the jerk value jW for the tractor vehicle jerk j2 and/or the jerk value jW for the trailer jerk j3 in each case exceed/exceeds a fixed jerk limit value jG in terms of magnitude. Here, as shown in FIG. 2, the magnitude of the respective jerk j2, j3 or of the respective jerk value jW is considered, the chronological sequence of the trailer jerk j3 likewise applying in a compatible way as shown in FIG. 2 (bottom) for the tractor vehicle jerk j2, with possibly scaled jerk values jW.

Here, the determination of the jerk limit value jG can take place, for example, in a manner which is dependent on the trailer mass M3 and/or the tractor vehicle mass M2, and/or can also be different for the tractor vehicle 2 and for the trailer 3. The heavier a trailer 3 is or the heavier the trailer mass M3 is in comparison with the tractor vehicle mass M2, the greater the tractor vehicle jerk j2 resulting at the tractor vehicle 2 or the magnitude of the jerk value jW for the tractor vehicle jerk j2 in the case of a worn-out or worn coupling connection 4, because the change of the tractor vehicle acceleration a2 is then greater at the jerk time tj. Different jerk values jW as a consequence of the play 20 can also result at the trailer 3 for different trailer masses M3 and also in comparison with the tractor vehicle 2. This is decisive, in particular, in the case of different loading states of the trailer 3 since an existing play 20 in the coupling connection 4 has a less pronounced effect on the tractor vehicle acceleration a2 in the case of an unloaded (light) trailer 3 than in the case of a loaded (heavy) trailer 3. This can be taken into consideration during the fixing of the jerk limit value jG by way of the recourse to a current trailer mass M3 (and also the tractor vehicle mass M2).

If the respective determined jerk j2, j3 has been traced back to a load change LW, the respective jerk time tj, at which this jerk j2, j3 was determined, is read or defined by the monitoring unit 10 for this jerk j2, j3 or the respective jerk value jW in a fourth step ST4. As an alternative or in addition, the time delay dt between the respective load change time tL (tB, tR, tV) and the jerk time tj can also be identified.

Subsequently, in a fifth step ST5, the degree of wear VG of the coupling connection 4 is defined in the monitoring unit 10 in a manner which is dependent on the time delay dt and/or in a manner which is dependent on the respective jerk value jW identified at the jerk time tj, the degree of wear VG being defined by way of the play 20 and this having an effect on the jerk j2, j3 at the respective vehicle part 1a in accordance with the above-described principles. Here, the difference D can additionally be taken into consideration if the trailer 3 is also braked actively, for example in the case of an anti-jackknifing brake operation. Here, the correlation between the degree of wear VG and the jerk value jW for the respective jerk j2, j3 and/or the time delay dt can be stored in a characteristic curve K or a look-up table LT in the tractor vehicle 2, with the result that reference can be made to a corresponding correlation.

In a sixth step ST6, the identified degree of wear VG can be output by the monitoring unit 10 to the driver (in the case of a manually operated vehicle combination 1) or the fleet operator (in the case of an autonomously operated vehicle combination 1) via a notification signal SC, in particular when the degree of wear VG exceeds a wear limit G. The coupling connection 4 can then be checked correspondingly. Here, a series of warning levels can also be taken into consideration. On the basis of the evaluated behavior, a load profile can also be produced over the service life of the coupling connection 4, in order to represent the loading over a relatively long time period and to react accordingly.

If the degree of wear VG is excessively high, a "minimum risk maneuver" can also be carried out by way of corresponding automated actuation of the electronic drive system 50 and/or the electronic brake system 40 of the tractor vehicle 2, in the case of which "minimum risk maneuver" the vehicle combination 1 is moved to a safe location, for example a hard shoulder. If the problem is determined by way of corresponding load change events directly after coupling, for example while driving in a depot, an onward journey from the depot can correspondingly also be prevented.

It is understood that the foregoing description is that of the preferred embodiments of the invention and that various changes and modifications may be made thereto without departing from the spirit and scope of the invention as defined in the appended claims.

LIST OF DESIGNATIONS (PART OF THE DESCRIPTION)

1 Vehicle combination
1a Vehicle part
2 Tractor vehicle
3 Trailer
4 Coupling connection
4a First coupling part
4b Second coupling part
5 Crossmember
6 Drawbar coupling
7 Eye
7a Front longitudinal side of the eye 7
7b Center of the eye 7
7c Rear longitudinal side of the eye 7
8 Drawbar
9 Bolt
10 Monitoring unit
11 Fifth wheel plate
16a Attachment bracket on the fifth wheel plate
16b Locking device
17 Kingpin
20 Play
30 Observation time period
40 Electronic brake system
50 Electronic drive system
60 Electronic clutch system
a2 Tractor vehicle acceleration
aW Acceleration value
AA Drive request
AV Trailer connection
BA Brake request
D Difference
dt Time delay
G Wear limit
GA Gear change request
j2 Tractor vehicle jerk
j3 Trailer jerk
jG Jerk limit value
jW Jerk value
K Characteristic curve KA Clutch request
LW Load change
LT Look-up table
M2 Tractor vehicle mass
M3 Trailer mass
SA Trailer status signal
SC Notification signal
S40 Brake signal
S50 Drive signal
S60 Clutch signal
t Time
tB Acceleration time
tj Jerk time
tL Load change time
tN Readjustment time
tR Rolling time
tV Retardation time
v Tractor vehicle speed
VG Degree of wear
ST1, ST2, ST3, ST4, ST5, ST6 Steps of a method

What is claimed is:

1. A method for monitoring a coupling connection between vehicle parts of a vehicle combination, the vehicle parts of the vehicle combination being at least one tractor vehicle and at least one trailer, the method comprising:
reading of a load change time at which a load change at least one of is initiated at the tractor vehicle and takes place at the tractor vehicle, wherein a tractor vehicle acceleration changes as a result of the load change;
monitoring of a jerk value after the load change time, wherein the jerk value characterizes at least one of a tractor vehicle jerk of the tractor vehicle and a trailer jerk of the trailer;
determining whether at least one of a tractor vehicle jerk occurs at the tractor vehicle and a trailer jerk occurs at the trailer on account of a preceding load change at a jerk time; and,
identifying a degree of wear of the coupling connection between the vehicle parts in a manner dependent upon at least one of the jerk time, a time delay between the load change time and the jerk time, and the jerk value at the jerk time.

2. The method of claim 1, wherein, in order to determine whether the load change at least one of is initiated and takes place, an identification is made as to whether at least one of a drive request, a brake request, a clutch request, and a gear change request is present or has ceased, wherein the identification is based on at least one of a drive signal of an electronic drive system of the tractor vehicle, a brake signal of an electronic brake system of the tractor vehicle, and a clutch signal of an electronic clutch system of the tractor vehicle.

3. The method of claim 1, wherein, in order to monitor the jerk value, after the load change time, at least one of the tractor vehicle acceleration over a time and a trailer acceleration over the time is identified; and, at least one of the jerk value for the tractor vehicle jerk and the jerk value for the trailer jerk is identified continuously by way of temporal deriving of the acceleration values which are identified as a result.

4. The method of claim 3, wherein the degree of wear follows from at least one of the time delay and the jerk value with consideration of a difference between the trailer acceleration and the tractor vehicle acceleration acting after the load change.

5. The method of claim 1, wherein, in order to determine whether, on account of a preceding load change at the jerk time, at least one of the tractor vehicle jerk at the tractor vehicle and the trailer jerk at the trailer occurs, a check is made as to whether a magnitude of the jerk value which characterizes the respective vehicle jerk and trailer jerk exceeds a fixed jerk limit value.

6. The method of claim 5, wherein the jerk limit value is fixed in a manner which is dependent upon at least one of a trailer mass of the trailer and a tractor vehicle mass of the tractor vehicle.

7. The method of claim 5, wherein different jerk limit values are fixed for the trailer jerk and the tractor vehicle jerk.

8. The method of claim 1, wherein the degree of wear follows via a characteristic curve or a look-up table from at least one of the time delay and the jerk value.

9. The method of claim 1 further comprising: outputting a notification signal in a manner dependent upon the identified degree of wear.

10. The method of claim 9, wherein the notification signal is output when the degree of wear exceeds a wear limit.

11. The method of claim 1, wherein at least one of an automated actuation of an electronic drive system of the tractor vehicle and of an electronic brake system of the tractor vehicle takes place in a manner which is dependent on the identified degree of wear in order to stop the vehicle combination in an automated manner.

12. The method of claim 1, wherein at least one of an automated actuation of an electronic drive system of the tractor vehicle and of an electronic brake system of the tractor vehicle takes place in a manner which is dependent on the identified degree of wear when the degree of wear exceeds a wear limit, in order to stop the vehicle combination in an automated manner.

13. The method of claim 1, wherein the coupling connection is formed by way of a first coupling part on a vehicle part of the vehicle combination and a second coupling part on a further vehicle part of the vehicle combination; the first coupling part and the second coupling part are connected to one another pivotably; and, the degree of wear is dependent upon a wear-induced play between the first coupling part and the second coupling part.

14. The method of claim 1, wherein, before the reading of the load change time, it is first determined whether there is a trailer connection between the vehicle parts of the vehicle combination.

15. The method of claim 1, wherein the monitoring of the coupling connection between the vehicle parts of the vehicle combination takes place over an observation time period, the observation time period being selected such that, in the observation time period, more than one load change takes place and a dedicated degree of wear is determined for each load change.

16. The method of claim 1, wherein, as a result of the load change, a tractor vehicle acceleration changes from a positive acceleration value to a negative acceleration value or vice versa.

17. The method of claim 1, wherein, as a result of a load change, a tractor vehicle acceleration changes from an acceleration value of zero to a negative acceleration value or a positive acceleration value.

18. The method of claim 1, wherein, as a result of a load change, a tractor vehicle acceleration changes from a negative acceleration value or a positive acceleration value to zero.

19. A vehicle combination comprising:
a plurality of vehicle parts including a first vehicle part and a further vehicle part;

a coupling connection being configured between said plurality of vehicle parts;

said plurality of vehicle parts being connected to one another pivotably via said coupling connection;

said coupling connection being formed by way of a first coupling part on said first vehicle part and a second coupling part on said further vehicle part of the vehicle combination;

said first coupling part and said second coupling part being connected to one another pivotably;

a monitoring unit arranged in said first vehicle part; and, said monitoring unit being configured to carry out the method of claim 1, in order to identify the degree of wear of said coupling connection in a manner which is dependent on a wear-induced play between the coupling parts.

20. The vehicle combination of claim 19, wherein said first vehicle part is a tractor vehicle.

* * * * *